(12) United States Patent
Boydston et al.

(10) Patent No.: US 12,138,853 B2
(45) Date of Patent: Nov. 12, 2024

(54) ADDITIVE MANUFACTURING OF METAL-INCORPORATED RESIN OBJECTS

(71) Applicant: Wisconsin Alumni Research Foundation, Madison, WI (US)

(72) Inventors: Andrew Jackson Boydston, Middleton, WI (US); Evan Sherbrook, Cambridge, MA (US)

(73) Assignee: Wisconsin Alumni Research Foundation, Madison, WI (US)

(*) Notice: Subject to any disclaimer, the term of this patent is extended or adjusted under 35 U.S.C. 154(b) by 264 days.

(21) Appl. No.: 17/906,405

(22) PCT Filed: Mar. 16, 2021

(86) PCT No.: PCT/US2021/022520
§ 371 (c)(1),
(2) Date: Sep. 15, 2022

(87) PCT Pub. No.: WO2021/188510
PCT Pub. Date: Sep. 23, 2021

(65) Prior Publication Data
US 2023/0139931 A1  May 4, 2023

Related U.S. Application Data

(60) Provisional application No. 62/990,514, filed on Mar. 17, 2020.

(51) Int. Cl.
*B29C 64/124* (2017.01)
*B29C 64/277* (2017.01)
(Continued)

(52) U.S. Cl.
CPC .......... *B29C 64/124* (2017.08); *B29C 64/277* (2017.08); *B33Y 10/00* (2014.12);
(Continued)

(58) Field of Classification Search
None
See application file for complete search history.

(56) References Cited

U.S. PATENT DOCUMENTS 5,980,813 A * 11/1999 Narang ............... B33Y 10/00
264/494
6,200,646 B1 * 3/2001 Neckers ............. G03F 7/0037
427/512
(Continued)

FOREIGN PATENT DOCUMENTS

CN 109232668 1/2019
CN 109895382 A 6/2019
(Continued)

OTHER PUBLICATIONS

Fantino—3D Printing of Conductive Struct. w-silver nanopart.—Ad. Mat.—2016 (Year: 2016).*
(Continued)

*Primary Examiner* — John Vincent Lawler
(74) *Attorney, Agent, or Firm* — Bell & Manning, LLC (57) ABSTRACT

In embodiments, a method for additive manufacturing of a metal-incorporated resin object comprises illuminating a curable composition comprising prepolymers, a metal compound, a photoredox catalyst, a polymerization initiator, and optionally, a redox agent, with light having a first wavelength, wherein the metal of the metal compound is characterized by an initial oxidation state, and the illumination induces polymerization reactions between prepolymers to form a first cured region and induces redox reactions to change the initial oxidation state of the metal in the first cured region. The method further comprises inducing polymerization reactions between prepolymers to form a second cured region different from the first cured region without inducing redox reactions in the second cured region. Also provided are the curable compositions, the additive (Continued)

manufacturing systems for carrying out the methods, and the metal-incorporated resin objects.

18 Claims, 6 Drawing Sheets

(51) Int. Cl.
- B29K 105/00 (2006.01)
- B29K 505/00 (2006.01)
- B33Y 10/00 (2015.01)
- B33Y 30/00 (2015.01)
- B33Y 70/10 (2020.01)

(52) U.S. Cl.
CPC ............... *B33Y 30/00* (2014.12); *B33Y 70/10* (2020.01); *B29K 2105/0002* (2013.01); *B29K 2505/00* (2013.01)

(56) References Cited

U.S. PATENT DOCUMENTS

| | | | |
|---|---|---|---|
| 9,695,280 | B2 | 7/2017 | Boydston et al. |
| 10,116,000 | B1 | 10/2018 | Federici |
| 2018/0036942 | A1 | 2/2018 | Clark et al. |
| 2018/0133800 | A1 | 5/2018 | Pieger |
| 2020/0406539 | A1 | 12/2020 | Boydston |
| 2021/0031438 | A1 | 2/2021 | Ge |
| 2021/0162657 | A1 | 6/2021 | Chartrain |

FOREIGN PATENT DOCUMENTS

| | | | | |
|---|---|---|---|---|
| WO | WO 00/00335 | 1/2000 | | |
| WO | WO 2018/057330 | 3/2018 | | |
| WO | WO-2018057330 A1 * | 3/2018 | ........... | B29C 64/106 |
| WO | WO 2018/208155 | 11/2018 | | |

OTHER PUBLICATIONS

International Search Report and Written Opinion for PCT/US2021/022520, mailed Jul. 6, 2021.

Capaldo, Luca, and Davide Ravelli. "Hydrogen atom transfer (HAT): a versatile strategy for substrate activation in photocatalyzed organic synthesis." *European Journal of Organic Chemistry* 2017.15 (2017): 2056-2071.

Bagheri, Ali, et al. "PET-RAFT Facilitated 3D Printing of Polymeric Materials." (2019).

Zhang, Zhiheng, et al. "A versatile 3D and 4D printing system through photocontrolled RAFT polymerization." Angewandte Chemie 131.50 (2019): 18122-18131.

Bagheri, Ali, et al. "3D printing of polymeric materials based on photo-RAFT polymerization." Polymer Chemistry 11.3 (2020): 641-647.

Bagheri, Ali, et al. "Oxygen tolerant PET-RAFT facilitated 3D printing of polymeric materials under visible LEDs." ACS Applied Polymer Materials 2.2 (2020): 782-790.

Liu, Chang, et al. "3D printing of multicolor luminescent glass." RSC advances 8.55 (2018): 31564-31567.

Hofmann, Manfred. "3D printing gets a boost and opportunities with polymer materials." (2014): 382-386.

Zhu, Xiaoqun, et al. "Direct, rapid, facile photochemical method for preparing copper nanoparticles and copper patterns." Langmuir 28.40 (2012): 14461-14469.

Fantino, Erika, et al. "3D printing of conductive complex structures with in situ generation of silver nanoparticles." Advanced Materials 28.19 (2016): 3712-3717.

Akamatsu, Kensuke, Shingo Ikeda, and Hidemi Nawafune. "Site-selective direct silver metallization on surface-modified polyimide layers." Langmuir 19.24 (2003): 10366-10371.

* cited by examiner

ADDITIVE MANUFACTURING OF METAL-INCORPORATED RESIN OBJECTS

CROSS REFERENCE TO RELATED APPLICATIONS

The present application is a National Stage of International Application No. PCT/US21/22520, filed Mar. 16, 2021, which claims priority to U.S. provisional patent application No. 62/990,514 that was filed Mar. 17, 2020, the entire contents of both of which are incorporated herein by reference.

REFERENCE TO GOVERNMENT RIGHTS

This invention was made with government support under W911NF-17-1-0595 awarded by the ARMY/ARO. The government has certain rights in the invention.

BACKGROUND

Additive manufacturing (AM), also known as 3D printing, refers to a number of technologies for fabricating three-dimensional (3D) objects based on digital data representing the 3D objects. The digital data is broken down into a series of two-dimensional (2D) cross-sections and the 3D object is fabricated layer-by-layer. There are a number of 3D printing technologies for polymeric (resin) materials, which are based on the types of starting materials (i.e., powder, pellets, wires, and liquids). Stereolithography (SLA) is a type of 3D printing technique in which liquid, generally containing photocurable prepolymers, in a vat is selectively cured by light-induced polymerization. Material jetting, or inkjet printing, is another type of 3D printing technique in which droplets of a prepolymer are selectively deposited on a substrate. The as-deposited material may also be cured via light-induced polymerization.

SUMMARY

Provided are methods for additive manufacturing of curable compositions which comprise prepolymers and a metal compound. The methods are capable of providing metal-incorporated resin objects having chemical, and thus, functional, heterogeneity. Specifically, different cured regions of the resin objects can have incorporated therein, metal (from the metal compound) having different oxidation states. This provides the different cured regions with different properties, including different colors. Also provided are the curable compositions, the additive manufacturing systems for carrying out the methods, and the metal-incorporated resin objects.

In embodiments, a method for additive manufacturing of a metal-incorporated resin object comprises illuminating a curable composition comprising prepolymers, a metal compound, a photoredox catalyst, a polymerization initiator, and optionally, a redox agent, with light having a first wavelength, wherein the metal of the metal compound is characterized by an initial oxidation state, and the illumination induces polymerization reactions between prepolymers to form a first cured region and induces redox reactions to change the initial oxidation state of the metal in the first cured region. The method further comprises inducing polymerization reactions between prepolymers to form a second cured region different from the first cured region without inducing redox reactions in the second cured region.

In embodiments, a metal-incorporated resin object comprises a layer of a plurality of cured regions, each cured region comprising a polymer, a metal, and a photoredox catalyst, wherein one or more of the cured regions of the plurality of cured regions comprise the metal having a first oxidation state and one or more other of the cured regions of the plurality of cured regions comprise the metal having a second oxidation state different from the first oxidation state.

In embodiments, a curable composition for forming a metal-incorporated resin object via additive manufacturing comprises prepolymers, a metal compound, a photoredox catalyst, a polymerization initiator, and optionally, a redox agent.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

The present methods and systems allow for the fabrication of 2D and 3D resin objects from curable compositions which comprise prepolymers and a metal compound. The methods and systems make use of light to both cure the prepolymers and to selectively change the oxidation state of the metal of the metal compound within desired regions of the curable composition.

In embodiments, a method for additive manufacturing comprises illuminating a curable composition comprising prepolymers, a metal compound, a photoredox catalyst, and a polymerization initiator with light. (As used herein, "prepolymer" refers to molecules from which the repeating units of a polymer are derived, e.g., monomers and/or oligomers which polymerize to form the polymer. In embodiments, the term "prepolymer" may also refer to polymer chains which become crosslinked through chemical reactions.) The light may illuminate a localized area of the curable composition. Since the various localized areas illuminated by the light are generally within the same plane, the curable composition being illuminated by be referred to as a "layer of the curable composition." At a certain wavelength (or range of wavelengths) of light, the light induces polymerization reactions between prepolymers (as initiated by the polymerization initiator) to form a polymer in the localized area. The cured, localized area may be referred to as a "cured region" of the curable composition. At the same time, the light at this wavelength induces a redox reaction (as catalyzed by the photoredox catalyst) to change an oxidation state of the metal of the metal compound in the localized area. This results in the cured region of polymer having incorporated therein, metal having a changed oxidation state (as compared to its initial oxidation state). This illumination step which achieves both polymerization and reduction/oxidation may be referred herein to as a "polymerization-plus-redox" step. Patterned light (further described below) may be used to provide the localized area/cured region with a predetermined shape or to illuminate multiple localized areas to form multiple cured regions.

The method further comprises inducing polymerization reactions between prepolymers in one or more other, different localized areas of the curable composition without inducing the redox reaction. (As used herein, the term "without" encompass zero as well as a number sufficiently small to have no material effect on the properties of the resulting cured region.) Thus, this step may be referred to herein as a "polymerization-only" step. (The term "only" has a meaning analogous to "without" as described above.) This step results in a different cured region(s) of polymer having incorporated therein, metal having an unchanged (i.e., initial) oxidation state. However, these different cured region(s) are generally within the same plane (i.e., layer) as the first cured regions(s) described above.

Thus, together, these two steps provide a layer of a plurality of cured regions of polymer, some cured regions which have incorporated therein, the metal having a first oxidation state and others of which have incorporated therein, the metal having a second, different oxidation state. Additional polymerization-plus-redox and polymerization-only steps may be carried out on additional layers of curable composition formed on the layer of the plurality of cured regions to form additional layers of cured regions. The collection of fabricated cured regions forms a cured object, e.g., a 3D object, the shape and dimensions of which can be controlled by characteristics of the illumination (e.g., its pattern) and digital data corresponding to the desired object.

The methods, comprising the two steps described above, differ from existing methods which may employ illumination of a region or a set of regions with one wavelength of light for polymerization and the same region/set of regions with another wavelength of light for reduction, e.g., see E. F. et al., *Adv. Mater.* 2016, 28, 3712-3717. Such existing methods do not create some cured regions with metal having a first oxidation state and other cured regions having the metal in a second, different oxidation state.

The "polymerization-plus-redox" step and the "polymerization-only" step may be carried out sequentially and in either order, but often, they are carried out simultaneously. The polymerization-only step may be carried out in various ways, but often, it is also carried out by illuminating the one or more other, different localized areas with light. However, in the polymerization-only step, the light has a wavelength (or range of wavelengths) selected such that polymerization reactions are induced between the prepolymers without inducing the redox reaction. Thus, the wavelength(s) of light used in the polymerization-plus-redox and polymerization-only steps will be different. Although different localized areas may be illuminated with light in the polymerization-only step as compared to the polymerization-plus-redox step to induce curing therein, since a different wavelength of light is used, the light may also illuminate localized areas/cured regions exposed/created during the polymerization-plus-redox step. Thus, the light used during a polymerization-only step need not be patterned, although it may be.

As noted above, other methods for inducing the polymerization-only step may be used, such as by heating. In fact, heating may still involve illumination with light, but in this case, the light may be absorbed by a photothermal base forming an interface with the layer of the curable composition (as opposed to being absorbed by the curable composition itself). The photothermal base comprises a photothermal material which absorbs the light to generate heat at the interface. The heat generated at the interface increases the temperature of the curable composition in the desired, localized area therein sufficient to induce polymerization reactions and curing therein. This type of stimulation, as well as suitable photothermal bases and related additive manufacturing systems, are described in U.S. Pat. Pub. No. 2020/0406539, which is hereby incorporated by reference in its entirety.

Figure 1:
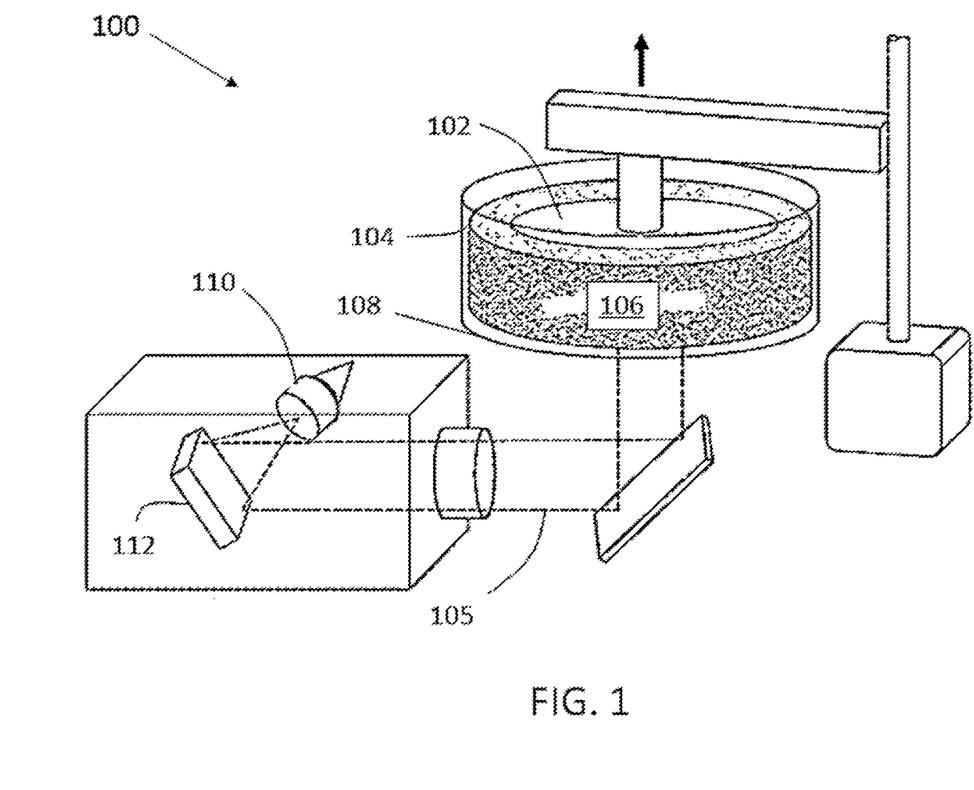
FIG. 1 depicts an illustrative embodiment of an SLA additive manufacturing system which may be used to carry out embodiments of the disclosed methods.

The methods may be carried out using a variety of additive manufacturing systems, but an illustrative SLA system 100 is shown in FIG. 1. The system 100 comprises a build plate 102 on which an object may be fabricated, a container (or vat) 104 configured to contain a curable composition 106. The container 104 has a base 108 which is transparent to at least some of the wavelength(s) of light used in the method (e.g., a percent transmission of at least 90%). As noted above, in some embodiments, this base 108 may be a photothermal base which is non-transparent to other wavelength(s) of light (e.g., a percent transmission of no more than 1%). The base 108 is mounted within the system 100 such that it can receive light 105 from a light source 110. In this illustrative embodiment, the light 105 is patterned using a digital micromirror device (DMD) 112 and shaped and directed using various optical elements (e.g., lens, mirrors, etc.). The curable composition 106 within the container 104 is in contact with the base 108 at an interface.

During operation of the system 100, the patterned light 105 passes through the base 108 to illuminate localized area(s) of the curable composition 106 extending from the base-curable composition interface. The number, arrangement, and dimensions of localized areas depends upon the characteristics of the patterned light 105 (controllable via the DMD, optical elements, etc.). As noted above, in a polymerization-plus-redox step, this illumination excites the polymerization initiator and the photoredox catalyst in the curable composition 106 to induce polymerization reactions and redox reactions, respectively, in the localized areas. This provides the cured region(s) of polymer having incorporated therein, metal having a changed oxidation state.

In a polymerization-only step, the system 100 may be used to provide light having a different wavelength (e.g., via a wavelength selector) as compared to the light 105. This light may also have a different pattern (e.g., via adjustment of the DMD mirrors) as compared to the light 105. However, the light may also be unpatterned such that the entire (or a relatively larger area) of the curable composition 106 at the base-curable composition interface is illuminated. Although FIG. 1 shows a single light source 110, an additional light source may be used, which is particularly useful for achieving simultaneous polymerization-plus-redox and polymerization-only steps. Either way, the polymerization-only step induces polymerization reactions without inducing redox reactions in different localized areas to provide cured region(s) of polymer having incorporated therein, metal having an unchanged oxidation state. Together, the polymerization-plus-redox and polymerization-only steps provide a layer of a plurality of cured regions of polymer, some of which have incorporated therein, the metal having a first oxidation state and others of which have incorporated therein, the metal having a second, different oxidation state.

If desired, a larger object may be formed in a layer-by-layer fashion. That is, after forming a first layer of cured regions (i.e., the layer comprising the plurality of cured regions), the build plate 102 may be moved upwards via a motor as indicated with the bold arrow in FIG. 1. The first layer of cured regions (adhered directly or indirectly to the build plate 102) separates from the base 108 at its interface and additional curable composition 106 flows to form a new layer. The polymerization-plus-redox and polymerization-only steps are carried out to form a second layer of cured regions. These steps may be repeated as desired.

Inkjet printing systems may also be used to carry out the present methods. Such systems are known and may be operated analogously to the description of the SLA system 100 above, except that the layers of the curable composition are formed by sequentially depositing the curable composition (e.g., via a nozzle of the system) onto an underlying base.

Light

The light used in the present methods may be characterized by its wavelength. Selection of the wavelength depends upon which step the light is being used (i.e., polymerization-plus-redox versus polymerization-only) as well as how the polymerization is being induced (i.e., photopolymerization via free radicals or ions versus thermal polymerization via heat). Thus, selection of the wavelength depends upon the particular photoredox catalyst and the polymerization initiator in the curable composition and whether a photothermal base is being used. (As further described below, "polymerization initiator" encompasses both photoinitiators which generate free radical or ions (cations or anions) upon illumination with light, as well as photothermal initiators which exhibit a photothermal effect upon illumination with light.) Light having a wavelength (or range of wavelengths) within the ultraviolet (UV) region of the electromagnetic spectrum, e.g., from about 100 nm to about 400 nm, is particularly useful for exciting many types of photoredox catalysts as well as many types of photoinitiators. However, light having a wavelength(s) in the visible region, e.g., from about 400 nm to about 700 nm may also be used for this purpose. Light having a wavelength(s) in the near-infrared region, e.g., from about 700 nm to about 1200 nm, is particularly useful for photothermal initiators as well as when making use of a photothermal base to induce thermal polymerization. The intensity of the light and duration of light illumination may be adjusted to achieve a desired curing efficiency as well as redox efficiency.

The source of the light is not particularly limited. Laser light is useful as such light can be intense and tightly focused (providing small illuminated areas and thus, high resolution). As noted above, the light may be (although it need not be) patterned. Patterned illumination maybe achieved by moving a single light beam (e.g., a laser) according to a predetermined pattern (i.e., scanning). As shown in FIG. 1, patterned illumination may also be achieved by using a DMD. Patterned light may also be achieved using a mask to transmit/block the light. Unpatterned light generally refers to light which is not being scanned, generated by a DMD, or passed through a mask. As noted above, more than one light source may be used in order to achieve the polymerization-plus-redox step and the polymerization-only step simultaneously.

Curable Composition

As noted above, the curable composition used in the present methods comprises prepolymers, a metal compound, a photoredox catalyst, and a polymerization initiator. Regarding the prepolymers, these are generally (but need not exclusively be) photocurable prepolymers. Photocurable prepolymers refer to monomers and/or oligomers which are polymerized through free radical polymerization reactions, cationic polymerization reactions, or anionic polymerization reactions. Such polymerization reactions are initiated by photoinitiators which generate free radical or ions (cations or anions) upon illumination with light.

However, thermally curable prepolymers may also be used. Thermally curable prepolymers include thermoset prepolymers which refer to monomers and/or oligomers which are polymerized through chemical reactions induced by heat. The heat may be generated by a photothermal material such as by using a photothermal initiator as the polymerization initiator or by using a photothermal base in the additive manufacturing system. The curable composition may include multiple types of photocurable prepolymers, multiple types of thermally curable prepolymers, or combinations of photocurable and thermally curable prepolymers.

The species of photocurable prepolymers and thermally curable prepolymers are not particularly limited. Illustrative photocurable prepolymers include those which form the following polymers upon curing: poly(meth)acrylates, vinyl polymers, polyvinylethers, polyvinylcarbazoles, polysiloxanes, polyepoxides, polystyrenes, etc. Illustrative thermoset prepolymers include those which form the following thermoset polymers upon curing: polyurethanes, epoxides, silicones (e.g., PDMS). Thermoset prepolymers comprising certain functional groups, e.g., isocyanates, silanes, cyanate esters, trifluorovinylether, phenylethynyl, and polyamic acid may be used. Thermally curable prepolymers also include inorganic materials such as metal oxides used in their liquid form. Illustrative prepolymers also include those described in International Patent Publication WO 2018/057330, which is hereby incorporated by reference in its entirety.

Regarding the metal compound, the species of metal compounds are also not particularly limited. However, selection is guided by choosing metal compounds which are sufficiently soluble in the curable composition. In embodiments, the metal compounds have a solubility in the curable composition of at least 1 weight %. Selection is also guided by considering the redox potential of the metal of the metal compound as compared to selected prepolymer(s). Generally, the metal of the metal compound has an oxidation potential less positive than that of the selected prepolymer(s) and a reduction potential more positive (i.e., less negative) than that of selected prepolymer(s). This requirement means that the metal of the metal compound will be oxidized or reduced preferentially over the prepolymer(s).

The metal of the metal compounds may be a transition metal, e.g., Fe, Cu, Ag, etc. The metal compounds may be metal salts or organometallic complexes.

The curable composition may include multiple types of metal compounds.

Regarding the photoredox catalyst, this is a compound which is capable of mediating the transfer of electrons between the other chemical species in the curable composition (including the metal compound) upon illumination with light. This includes accepting, donating, or both accepting and donating, an electron from/to another chemical species. By way of illustration only, FIG. 2A demonstrates how a particular polyoxotungstate photoredox catalyst, tetra-n-butylammonium decatungstate ($W_{10}O_{32}^{4-}$), functions in the presence of an alcohol (ROH) and a metal compound (copper(II) trifluoroacetate). Upon illumination with visible light, the photoredox catalyst abstracts a proton from the alcohol which, in turn, functions as a reducing agent to reduce $Cu^+$ in solution to $Cu(0)$. Thus, the redox reaction is the reduction of copper and the oxidation of the alcohol to a carbonyl. As illustrated in this figure, photoredox catalysts are returned to their original state upon completion of the reaction sequence. At least in embodiments, the photoredox catalyst is not 2-hydroxy-2-methyl-1-phenyl-propane-1-one (Darocur 1173), a photoinitiated single electron donor, which does not return to its original state upon completion of a redox reaction, but rather, is permanently degraded to other species.

Figure 2A:
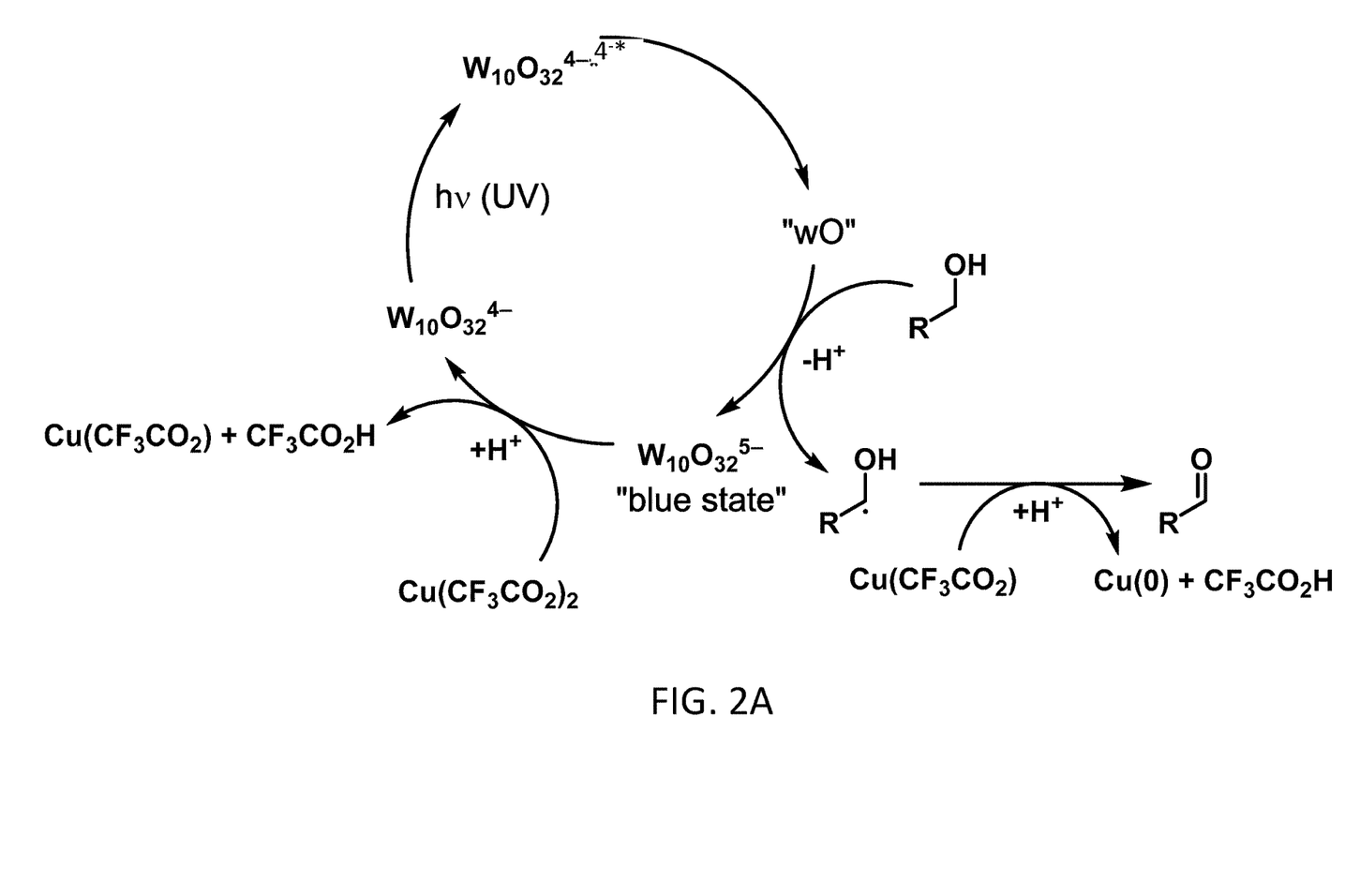
FIG. 2A is a schematic illustrating the function of a specific photoredox catalyst ($W_{10}O_{32}^{4-}$, tetrabutylammonium decatungstate, TBADT).
Figure 2B:
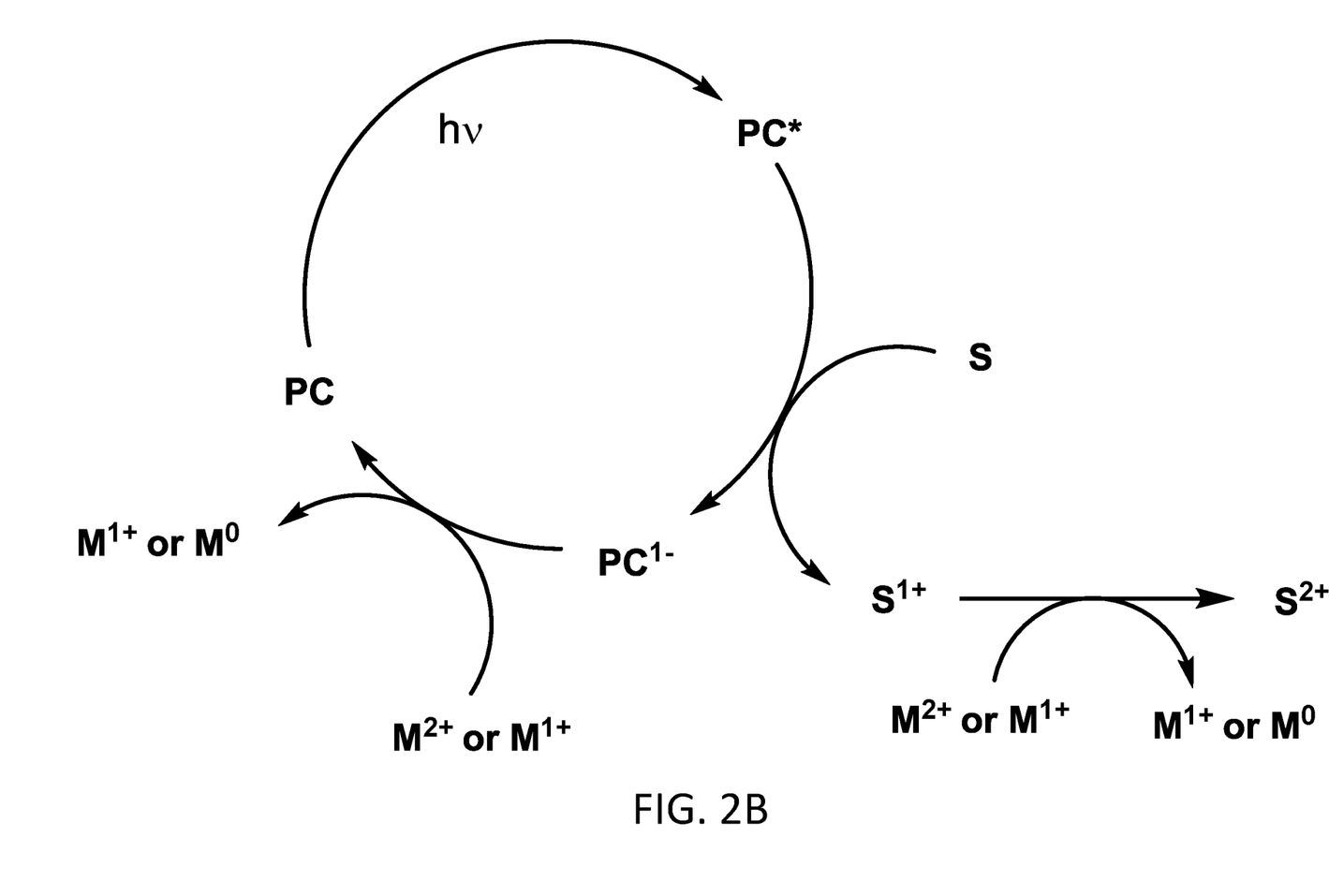
FIG. 2B is a schematic illustrating the function of a generic photoredox catalyst (PC).

FIG. 2B demonstrates the function of a generic photoredox catalyst (PC) in the present curable compositions comprising a metal (M) from a metal compound and a substrate (S) to be oxidized. As shown in FIG. 2A, that substrate may be a hydroxyl group of an alcohol.

Figure 2C:
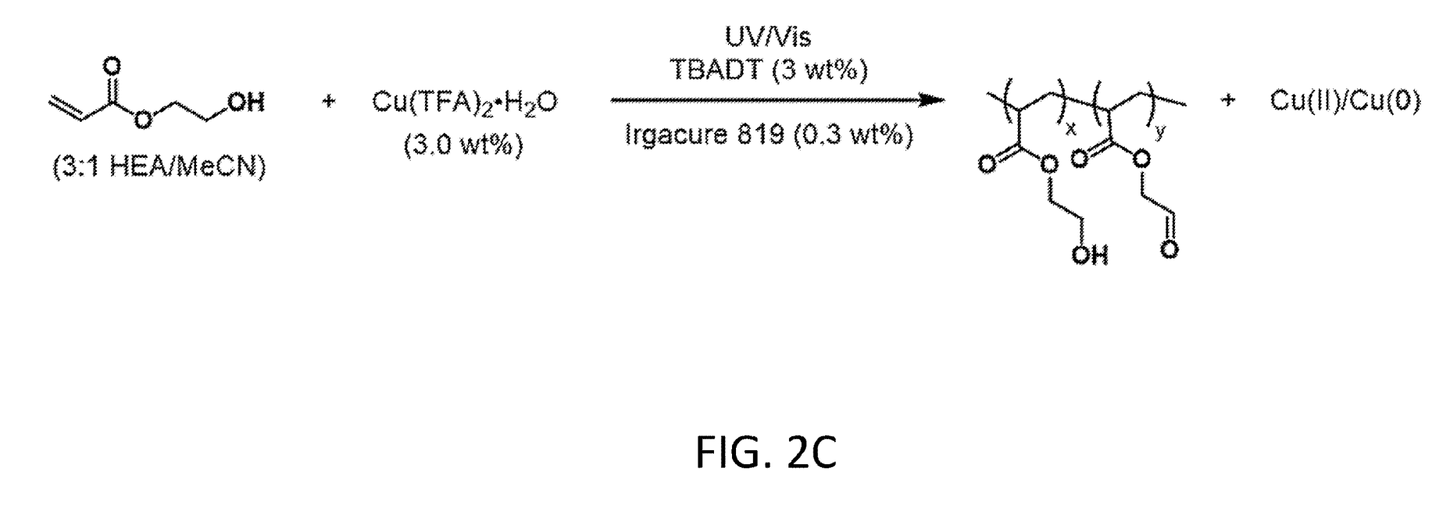
FIG. 2C is a schematic illustrating the chemical reactions associated with the conversion of an illustrative curable composition to a metal-incorporated resin object via embodiments of the disclosed methods.

FIG. 2C is a reaction scheme illustrating how the photoredox catalyst of FIG. 2A (TBADT), functions in an illustrative curable composition comprising a photoprepolymer, 2-hydroxyethylacrylate (HEA), and the metal compound, copper(II) trifluoroacetate ($Cu(TFA)_2$). Upon illumination with UV light, the photoredox catalyst induces a redox reaction involving the hydroxyl group of HEA, which is oxidized to a carbonyl group on the polymer, and the copper of $Cu(TFA)_2$, which is reduced to Cu(0) in the polymer. Thus, in this case, the substrate (S), is the hydroxyl group of the photoprepolymer.

A variety of species of photoredox catalysts may be used. Selection depends upon factors such as the desired metal compound and the desired wavelength(s) of light to be used in the polymerization-plus-redox step. Illustrative species include polyoxotungstates, polypyridyl complexes of ruthenium and iridium, and pyridinium and acridinium salts. The curable composition may include multiple types of photoredox catalysts.

It is noted that at least some photoredox catalysts may also be capable of inducing polymerization of prepolymers, e.g., due to the hydrogen atom abstraction/radical formation, but this is not required.

Regarding the polymerization initiator, as noted above, this term encompasses both photoinitiators and photothermal initiators. Various species of either type may be used. Selection depends upon factors such as the desired prepolymers and the desired wavelength(s) of light to be used in the polymerization-plus-redox and polymerization-only steps. Illustrative photoinitiators include phosphine oxides, α-hydroxyphenyl ketones, α-halo carbonyls, and triarylsulfonium salts. Illustrative photothermal initiators include croconaine dyes and cyanine dyes. In embodiments, a single type of polymerization initiator is used, i.e., only one type. In embodiments, a single type of polymerization initiator is used and the photoredox catalyst does not induce polymerization of prepolymers. (Here, "does not" encompasses zero as well as a number sufficiently small to have no material ability to induce polymerization.)

Polymerization initiators disclosed in U.S. Pat. Pub. No. 2020/0406539 and International Patent Publication WO 2018/057330 may also be used.

The curable compositions may also comprise a redox agent, i.e., either a reducing agent or an oxidizing agent, depending upon the type of oxidation change being induced in the metal. As shown in FIG. 2B and described above, in at least some embodiments, the prepolymer(s) serves as a redox agent, and thus, a separate redox agent is not necessary. The curable compositions may include any solvents necessary for solubilizing the components described above. Curing agents which are useful to facilitate curing and formation of the desired polymer may be included. Functional additives may be included to adjust the properties (e.g., mechanical strength, chemical reactivity, etc.) of the fabricated object. Such functional additives may include particles or nanoparticles (of various compositions). Examples include biocidal glass particles, metal oxide particles, and silica particles.

The curable compositions may be made by mixing the components at desired relative amounts in a solvent(s). The relative amounts may be adjusted to facilitate curing, facilitate reduction/oxidation, to achieve certain properties of the fabricated object, etc.

Figure 3A:
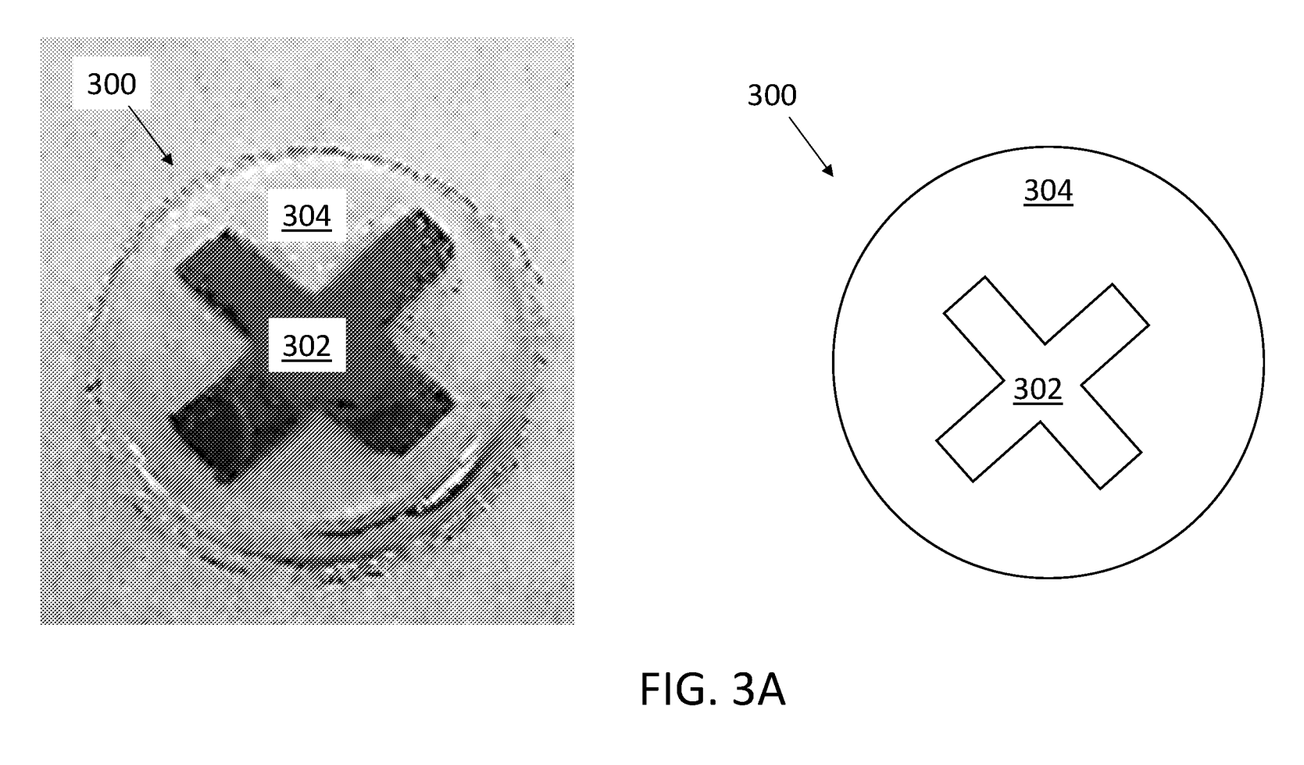
FIGS. 3A and 3B show images of two different metal-incorporated resin objects printed according to an embodiment of the disclosed methods.
Figure 3B:
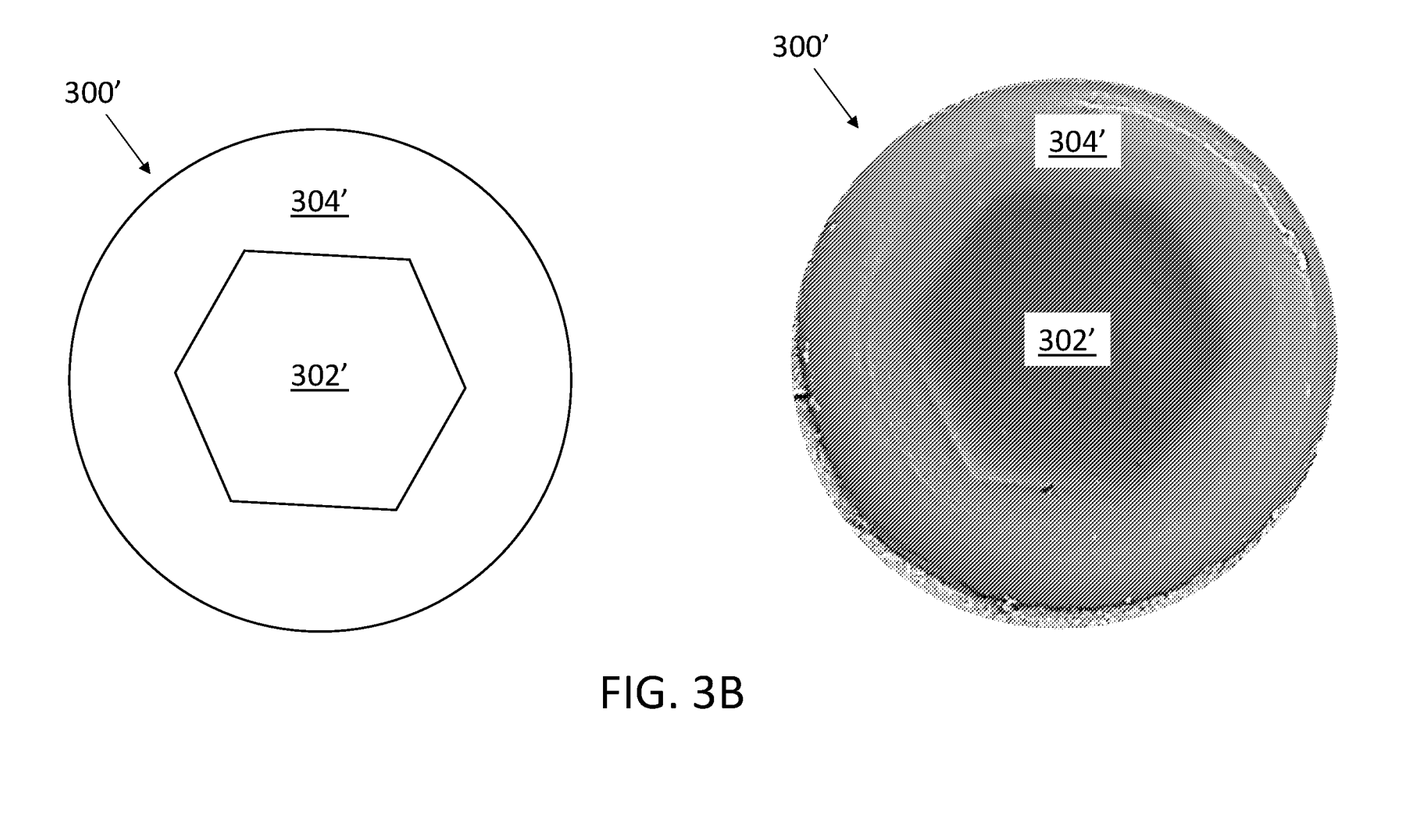

With reference back to the system 100 of FIG. 1 and as described above, a first polymerization-plus-redox step and a polymerization-only step (which may be carried out simultaneously) provides a layer of a plurality of cured regions, in which some cured regions have metal at a first oxidation state and other cured regions have metal at a second oxidation state. The shape, dimensions, and relative position of the cured regions within the layer depends upon the illumination characteristics as described above. This layer may be referred to as a 2D object. As further described in the Example, below, a system similar to system 100 of FIG. 1 was used to form 2D objects from acrylate prepolymers. Images of two such objects 300, 300' are shown in FIGS. 3A and 3B. For clarity, a schematic of each object is shown next to each image. For both objects, illumination with patterned UV light was used to provide first cured regions 302, 302' having either a cross shape (FIG. 3A) or a hexagon shape (FIG. 3B). The UV light both cured the curable composition and induced reduction of $Cu^{2+}$ in the curable composition to Cu(0). Since Cu(0) is orange/red, the first cured regions appear orange/red. Illumination with unpatterned visible light cured the curable composition without reducing $Cu^{2+}$, resulting in second cured regions 304, 304' which remain blue in color. As noted above, although the objects of FIGS. 3A and 3B may be considered to be 2D objects, additional polymerization-plus-redox and polymerization-only steps may be carried out with additional layers of curable composition to fabricate additional layers of cured regions and thus, a 3D object.

Objects fabricated by the present methods need not be (although they can be) subjected to any desired post-processing steps. By way of illustration only, the 2D object of FIG. 3A gradually turned a uniform bluish color after about 24 hours in air due to the gradual oxidation of Cu(0). However, exposing such objects to an antioxidant, an acid (such as a carboxylic acid), a thiol, an amine, or a diamine (e.g., by washing or soaking the object) may be used to inhibit such oxidation. In embodiments, the object fabricated by the present methods is fully cured, e.g., greater than 95% of the material of the object has been converted into an insoluble, intractable, solid form. In other words, the object's gel fraction is greater than 95%. In other embodiments, the object fabricated by the present methods is partially cured and may be subjected to a post-curing step, e.g., additional light illumination or heating in an oven. However, in such embodiments, the partially cured object may have fixity, meaning the curing has been sufficient to allow the partially cure object to freely stand under its own weight without deforming.

It is noted that system 100 is merely illustrative and additive manufacturing systems for carrying out the present methods may include additional, fewer, and/or different components as compared to those shown in FIG. 1.

Regarding additional components of suitable additive manufacturing systems, including system 100, other optical, mechanical, and/or electrical assemblies/devices may be used. In addition, suitable additive manufacturing systems, including system 100, may include a controller configured to control one or more components of the system 100. The controller may be integrated into the system as part of a single device or its functionality may be distributed across one or more devices that are connected to other system components directly or through a network that may be wired or wireless. A database, a data repository for the system, may also be included and operably coupled to the controller. Such a controller may include an input interface, an output interface, a communication interface, a computer-readable medium, a processor, and an application. The controller may be a computer of any form factor including an electrical circuit board. Regarding the application, it performs operations associated with controlling other components of the system 100. Some of these operations may include receiving and/or processing digital data to be used during fabrication of the object. The digital data includes information relating to the desired shape and dimensions of the object. Other of these operations may include controlling components of the system 100 based on the digital data. Some or all of the operations described in the present disclosure may be controlled by instructions embodied in the application.

It is noted that devices including the processor referenced above, the computer-readable medium operably coupled to the processor, the computer-readable medium having computer-readable instructions stored thereon that, when executed by the processor, cause the device to perform any of the operations described above (or various combinations thereof) are encompassed by the disclosure. The computer-readable medium is similarly encompassed.

Resin Objects

The present disclosure also encompasses the 2D or 3D objects formed using any of the methods described above. Such objects will be characterized by having a plurality of cured regions of polymer, some of which have incorporated therein, metal of a first oxidation state, others of which have incorporated therein, metal of a second oxidation state. As a result, the objects may be multi-colored in which different cured regions have different colors. However, despite the chemical heterogeneity due to the different metal oxidation states, each of the cured regions may be formed of the same polymer. These objects may also be characterized as comprising the photoredox catalyst as well as the polymerization initiator (or a derivative thereof).

As used herein, the term "mount" includes join, unite, connect, couple, associate, insert, hang, hold, affix, attach, fasten, bind, paste, secure, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element). The elements may be mounted permanently, removably, or releasably unless specified otherwise.

Example

A curable composition was formed by combining the following reagents without purification: 2-hydroxyethyl acrylate (HEA) prepared as a 3:1 mixture with acetonitrile (MeCN); $Cu(TFA)_2 \cdot xH_2O$; tetrabutylammonium decatungstate (TBADT); and Irgacure 819. The amounts used are those shown in FIG. 2C. A short sonication was carried out to facilitate dissolution. The photoprepolymer, HEA, exhibits its fast polymerization behavior, forms soft, flexible polymers, and provides an alcohol side chain, which functions as a reducing agent as described above. The metal compound, $Cu(TFA)_2 \cdot xH_2O$, is highly soluble in HEA/MeCN. The photoredox catalyst, TBADT, catalyzes both metal reduction and alcohol oxidation as described above. Irgacure 819 is a photoinitiator suitable for initiating the polymerization of acrylates at 440 nm and below.

The curable composition was transferred to a transparent vial which had its inner bottom surface coated in polydimethylsiloxane (PDMS) (to facilitate removal of the cured object). The vial was left open during irradiation. In a first step, the bottom of the vial was irradiated with patterned UV light (370 nm) for about 2 min, accomplished using a physical mask. The UV light intensity was ~200 mW/cm². In a second step, the mask was then removed, and the bottom of the vial was irradiated with unpatterned visible light (427 nm) for about 2 min. The vial was allowed to sit for 5-10 min, then the cured object was removed from the vial. Two objects 300, 300' made using this process are shown in FIGS. 3A and 3B. For both objects, illumination with the patterned UV light in the first step provided the first cured regions 302, 302' having either a cross shape (FIG. 3A) or a hexagon shape (FIG. 3B). The UV light both cured the curable composition and induced reduction of $Cu^{2+}$ in the curable composition to Cu(0). Since Cu(0) is orange/red, the first cured regions appear orange/red. Illumination with the unpatterned visible light in the second step cured the curable composition without reducing $Cu^{2+}$, resulting in second cured regions 304, 304' which remain blue in color. The result is an object containing a Cu(0) area defined by the area that received UV light, with the rest of the area containing Cu(II) as defined by the area that only received visible light.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for additive manufacturing of a metal-incorporated resin object comprising:
    (a) illuminating a curable composition comprising prepolymers, a metal compound, a photoredox catalyst, a polymerization initiator, and optionally, a redox agent, with light having a first wavelength, wherein the metal of the metal compound is characterized by an initial oxidation state, and the illumination induces polymerization reactions between prepolymers to form a first cured region and induces redox reactions to change the initial oxidation state of the metal in the first cured region; and (b) inducing polymerization reactions between prepolymers to form a second cured region different from the first cured region without inducing redox reactions in the second cured region.

2. The method of claim 1, wherein the first and second cured regions are among those in a layer of a plurality of cured regions.

3. The method of claim 1, wherein step (a) and step (b) are carried out simultaneously.

4. The method of claim 1, further comprising repeating steps (a) and (b) one or more additional times with additional curable composition.

5. The method of claim 1, wherein the light having the first wavelength is patterned light.

6. The method of claim 1, wherein step (b) is carried out using illumination with light having a second wavelength different from the first wavelength.

7. The method of claim 6, wherein the light having the second wavelength is unpatterned.

8. The method of claim 1, wherein the prepolymers comprise photoprepolymers and the polymerization initiators comprise photoinitiators.

9. The method of claim 1, wherein the prepolymers comprise thermally curable prepolymers and the polymerization initiators comprise photothermal initiators or the curable composition is in contact with a photothermal base.

10. The method of claim 1, wherein the metal compound is a metal salt.

11. The method of claim 1, wherein the photoredox catalyst is a polyoxotungstate, a polypyridyl complex, a pyridinium salt, an acridinium salt, or combinations thereof.

12. The method of claim 1, wherein the polymerization initiator is the only polymerization initiator in the curable composition.

13. An additive manufacturing system comprising:
a source configured to provide the curable composition of claim 1; and
a controller comprising a processor, and a non-transitory computer-readable medium operably coupled to the processor, the computer-readable medium comprising instructions that, when executed perform operations comprising steps (a) and (b) of claim 1.

14. The system of claim 13, further comprising the curable composition.

15. The system of claim 13, further comprising two light sources.

16. A metal-incorporated resin object comprising a layer of a plurality of cured regions, each cured region comprising a polymer, a metal, and a photoredox catalyst, wherein one or more of the cured regions of the plurality of cured regions comprise the metal having a first oxidation state and one or more other of the cured regions of the plurality of cured regions comprise the metal having a second oxidation state different from the first oxidation state.

17. The resin object of claim 16, further comprising one or more additional layers of additional cured regions, the additional cured regions comprising the polymer, the metal, and the photoredox catalyst.

18. A curable composition for forming a metal-incorporated resin object via additive manufacturing, the composition comprising prepolymers, a metal compound, a photoredox catalyst, a polymerization initiator, and optionally, a redox agent.

* * * * *